(12) United States Patent
Wang et al.

(10) Patent No.: US 8,244,115 B2
(45) Date of Patent: *Aug. 14, 2012

(54) COMBINATION FLASHLIGHT AND A DEVICE FOR DISPENSING A VOLATILE SUBSTANCE

(75) Inventors: Wender Wang, Wilmington, MA (US); Stephen Shapiro, Arlington, MA (US)

(73) Assignee: The Schawbel Corporation, Bedord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,663

(22) Filed: Nov. 16, 2010

(65) Prior Publication Data

US 2011/0057051 A1    Mar. 10, 2011

Related U.S. Application Data

(63) Continuation-in-part of application No. 12/129,502, filed on May 29, 2008, now Pat. No. 7,835,631.

(51) Int. Cl.
*E21B 7/15* (2006.01)
*B05B 1/24* (2006.01)

(52) U.S. Cl. ...................................... 392/303; 239/135

(58) Field of Classification Search .......... 392/301–306; 239/135, 136–139; 432/94; 431/344
See application file for complete search history.

(56) References Cited

U.S. PATENT DOCUMENTS

| | | | | |
|---|---|---|---|---|
| 1,327,161 A * | 1/1920 | Kaufman | ...................... | 431/240 |
| 3,443,083 A * | 5/1969 | Curran | ........................ | 362/643 |
| 7,835,631 B2 * | 11/2010 | Wang et al. | ................... | 392/303 |
| 2009/0294553 A1 * | 12/2009 | Wang et al. | ................... | 239/135 |

* cited by examiner

*Primary Examiner* — Daniel L Robinson
(74) *Attorney, Agent, or Firm* — Levinsohn Berger LLP

(57) ABSTRACT

A combination flashlight and insect repellent dispensing apparatus. Light is produced by light bulbs or LEDs whereas insect repellent is dispensed by heating a volatilizable insecticide. The insecticide and portable light may be used either concurrently or independently of each other.

19 Claims, 7 Drawing Sheets

COMBINATION FLASHLIGHT AND A DEVICE FOR DISPENSING A VOLATILE SUBSTANCE

RELATED APPLICATIONS

This Application is Continuation-in-Part of U.S. application Ser. No. 12/129,502 filed on May 29, 2008 to issue as U.S. Pat. No. 7,835,631 on Nov. 16, 2010—the contents of which are incorporated by reference herein.

FIELD OF THE INVENTION

The present invention relates generally to devices for dispensing volatile substances and more particularly a device that combines a flashlight and a dispensing system that uses fossil or hydrocarbon fuels to heat volatile substances so they may be dispensed.

BACKGROUND OF THE INVENTION

Many people utilize portable devices to heat volatile substances such as mosquito repellents as part of camping gear or for various outdoor activities where there exists a threat of mosquitoes. Such volatile substances most commonly are either insect control active ingredients or air treatment materials, such as air fresheners. The mosquito repellent systems are many fold, and for camping or special uses, it is desirous that the mosquito repellent system be portable.

An example of a prior art mosquito repellent system is that of U.S. Pat. No. 5,928,605, assigned to the instant assignee. In that device, a butane cartridge supplies fuel to uniformly heat a thermally conductive plate upon which a mat containing volatile insect repellent is positioned. When the plate is sufficiently heated, the insect repellent is volatilized and thereby dispensed. The evaporation of the insecticide and its dispersion causes mosquitoes to be repelled for a reasonable space around the portable mosquito repellent device.

Another prior art product is that identified as OFF sold by SC Johnson (U.S. Pat. No. 6,663,838 and others). In that device, a candle is provided that heats a mat placed in a vertical position atop thereto. The heat from the lighted candle causes insecticide in the mat to evaporate therefrom and be dispersed.

Both prior art devices lack versatility and have limitations. In particular, the prior Thermacell product does not have a light available to illuminate an area, whereas the OFF product has a flame which acts both as a source of light to illuminate an area and as a source of heat to volatilize a substance to be dispensed. The small flame required to volatilize the volatile substance is not very luminous and its intensity cannot be controlled. Moreover, a user cannot turn off the light source without terminating the dispersal of insect repellent.

U.S. Pat. No. 6,033,212, assigned to the instant assignee, discloses a lamp which both provides light and also dispenses a volatile substance. The light is produced by burning a hydrocarbon fuel, with the excess heat being harnessed to heat a thermally conductive plate upon which a mat containing the repellant is placed. However, this device similarly suffers from a poor quality light and does allow a user to turn off the light source without terminating the dispersal of insect repellent.

The portable lantern disclosed in application Ser. No. 12/129,502 solves the above-mentioned problems by allowing providing an electric light source and a repellent dispensing device—both of which are independently controllable. However, the use of lantern is not always suitable for ones illuminating needs. At times, a more focused flashlight light is desired, such as, for example, when walking around a campsite, backyard or other such dark areas.

SUMMARY OF THE INVENTION

The present invention addresses these limitations by providing a handheld flashlight having a device to dispense a volatile substance. The light source and the dispersal of a volatilizable substance are each individually controllable. A thermally conductive heating plate upon which a mat impregnated with a volatilizable substance is placed dispenses the mosquito repellent, and one or more light bulbs or LEDs, which are powered by a portable battery, are provided for emitting light. The light that is generated by the LEDs is consistent, and its brightness can be adjusted according to a user's preference. The lamp provides bright light when desired, and in contrast with the prior art SC Johnson device, there is no open flame, no match and no lighter needed to operate the device.

The flashlight may be utilized solely as a flashlight without the operation of the mosquito repellent system, or the mosquito repellent system can operate without the use of the separate lighting system. In some cases, one or other will be desired and yet in other cases both mosquito repellent and suitable local light will be desired.

The insect repellent is dispensed in accordance with the teachings of U.S. Pat. Nos. 6,033,212, 5,928,605 and 5,944,508 all of which are incorporated by reference herein. Those patents all teach the use of a portable source of fuel for sustaining a flame, the heat from which is directed to a thermally conductive plate, which is in contact with a mat containing a volatilizable insecticide. When the plate is sufficiently heated, the insecticide is volatilized and thereby dispensed.

An object of this invention is to provide an improved combination portable flashlight and mosquito repellent system.

Yet another object of this invention is to provide a portable device in which each of a flashlight and a mosquito repellent system is operated independently of one another.

Yet another object of this invention is to provide the ability to control the amount of light in the flashlight/repellent combination device.

Yet another object of this invention provides a lightweight, simple to use, and effective combination flashlight and mosquito repellent device suitable for widespread outdoor use.

It is still another object of the invention to provide a portable flashlight, which dispenses volatilizable substances such as, for example, aromatic substances.

Other objects, advantages and features of this invention will become more apparent from the following description.

DETAILED DESCRIPTION OF THE INVENTION

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

As mentioned, insect repellent is volatilized and dispensed according to the teachings of the US patents incorporated by reference herein. Below, however, is a description of how those teachings may be incorporated into the present invention. Although the current application describes volatilizing insecticide, it will be understood that any volatilizable substance may be dispensed according to the teachings herein.

Figure 1:
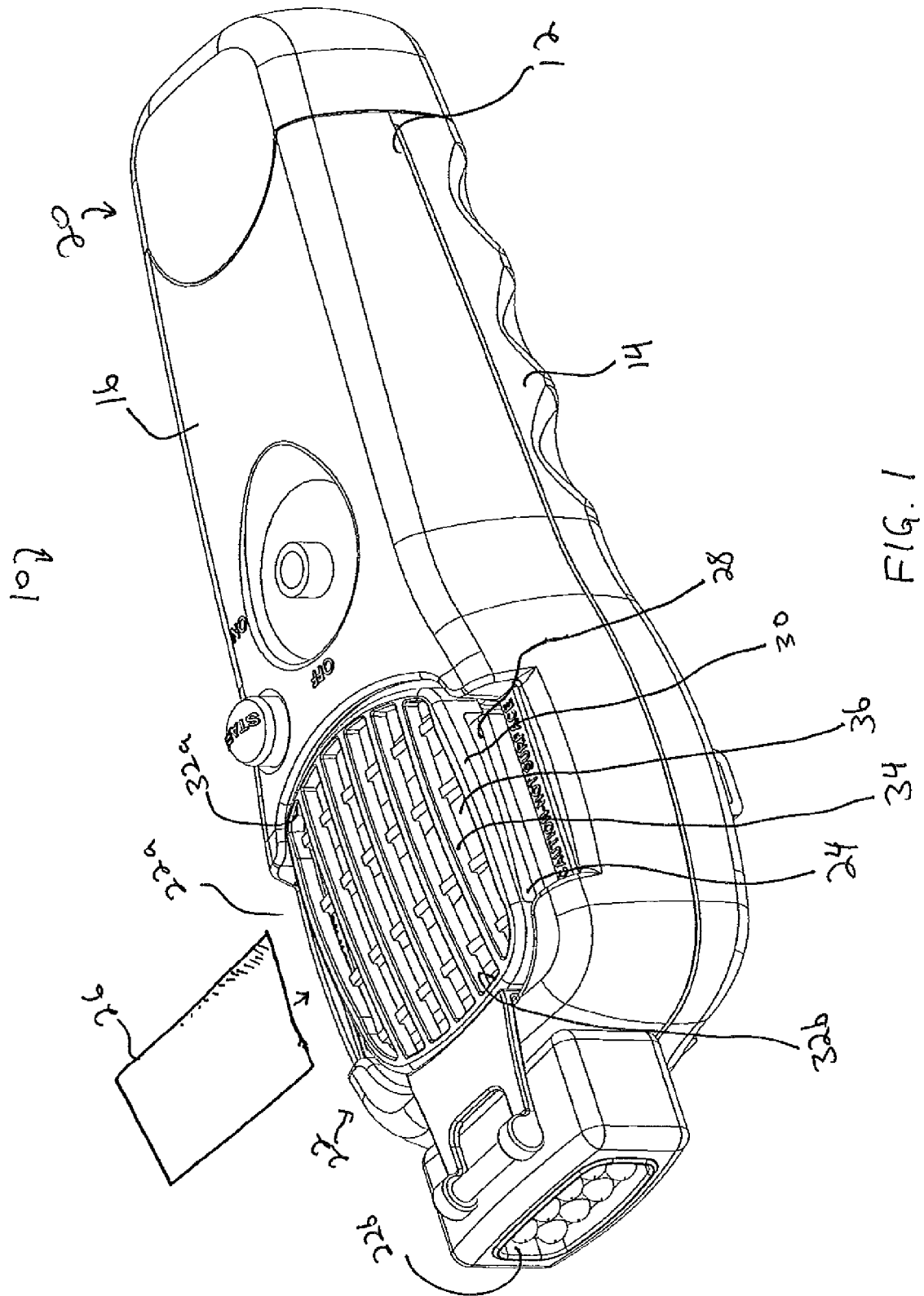
FIG. 1 is a perspective, top view of a flashlight/dispenser unit according to an embodiment of the invention.

Referring to FIG. 1, the housing 12 of flashlight 10 includes a bottom housing section 14, a top housing section 16 and an LED housing 18. The housing sections encase the mechanical elements of the unit and as shown in more detail below, the inside areas of the housing sections are configured to accommodate various working components of the unit. A first end 20 of the housing 12 comprises an elongated handle area that is suitably sized to be gripped by a user. Second end 22 comprises a dispensing area 22a and a light emitting area 22b. The light emitting area 22b is at the end opposing the handle 20 as is conventional with flashlights.

As shown, the top surface of dispensing area 22a is provided with a slot 24 for inserting a mat 26. Slot 24 is defined by at least a bottom surface 28, an upper surface 30 and two side surfaces 32a 32b. Preferably, the floor, or bottom surface 28 of the slot comprises a thermally conductive heating plate such that when the mat 26 is inserted, it is in physical thermal contact with the heating plate. The top surface of slot 24 comprises a grill 34, which protects mat 26 when inserted into slot 24, while allowing for volatilized substances to escape through a plurality of vents 36. Side surfaces 32a, 32b are spaced apart to roughly accommodate the width of a mat and such present a physical barrier for the lateral movement thereof.

Figure 2:
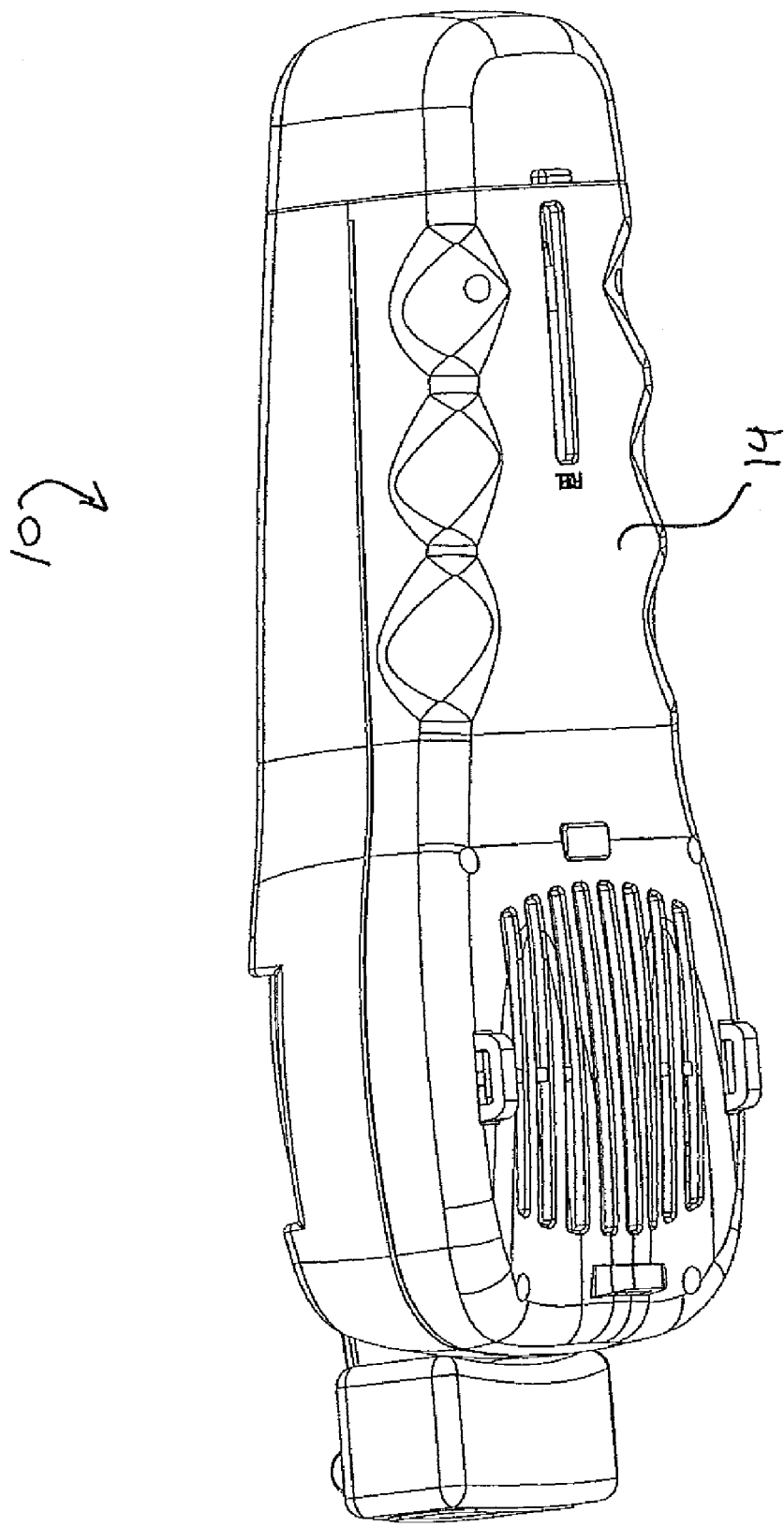
FIG. 2 is a perspective, bottom view of a flashlight/dispenser unit according to an embodiment of the invention.

FIG. 2 shows a bottom perspective view of the flashlight unit. The underside of bottom housing 14 is the bottom surface of the unit.

Figure 3:
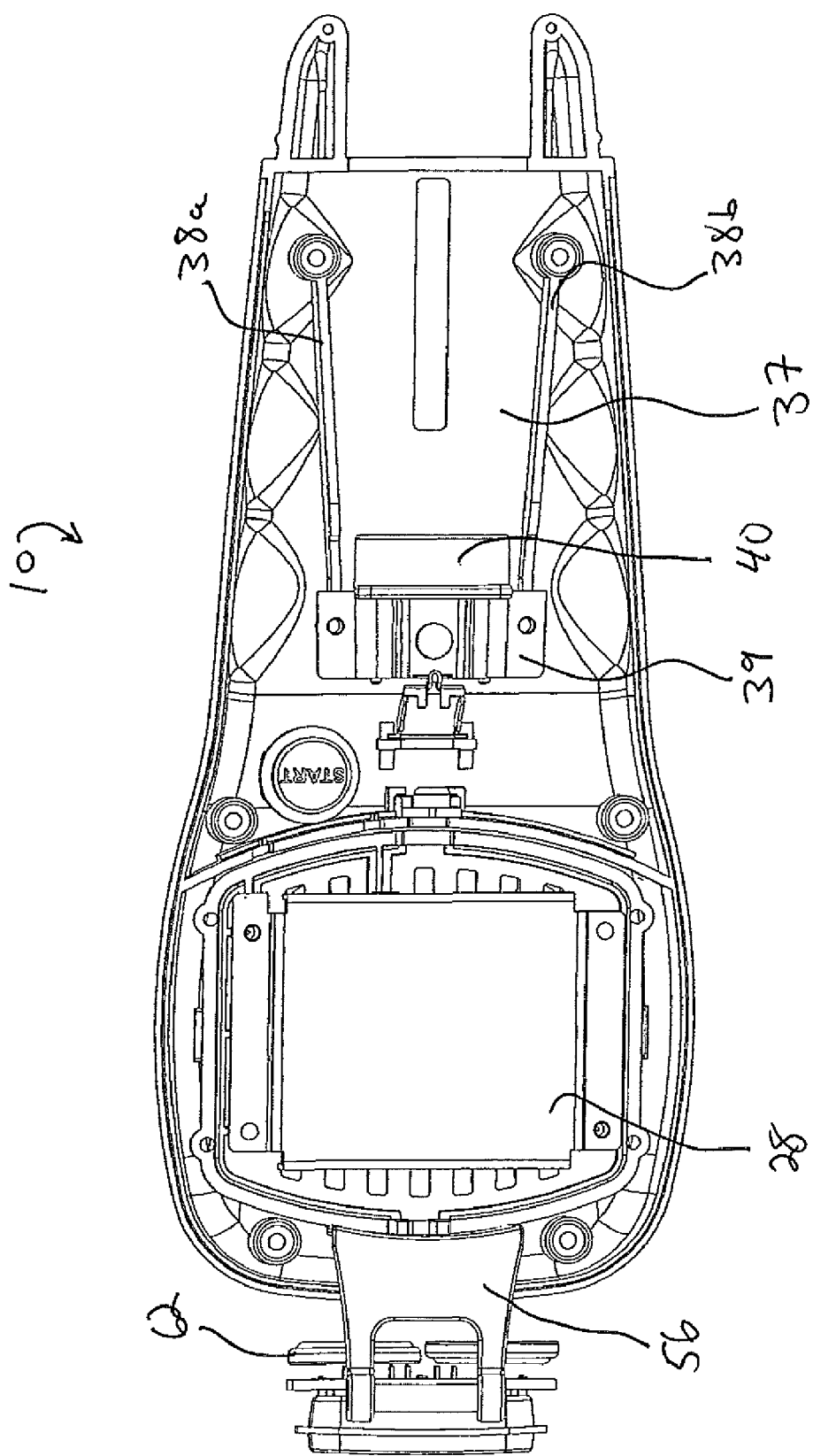
FIG. 3 is a top, broken away view of a flashlight/dispenser unit according to an embodiment of the invention.

FIG. 3 shows a top view of the flashlight whereby top housing is removed to show the inner mechanics of the dispensing system. In this view, the bottom housing 14 is shown from the inside of the unit. The inside of bottom housing 14 comprises a cavity 37 that is sized and shaped to receive a horizontally oriented fuel cartridge (shown in FIG. 4). Cavity 37 is defined by roughly parallel running walls 38a, 38b which are connected (for example, either integrally molded or otherwise affixed) to the inside of bottom housing section 14. A plate 39 bridging walls 38a and 38b supports a tank connection assembly 40 roughly at the top, center of cavity 37. In a preferred embodiment, tank connection assembly 40 is provided with threads for threadably coupling a threaded fuel cartridge therewith.

Figure 4:
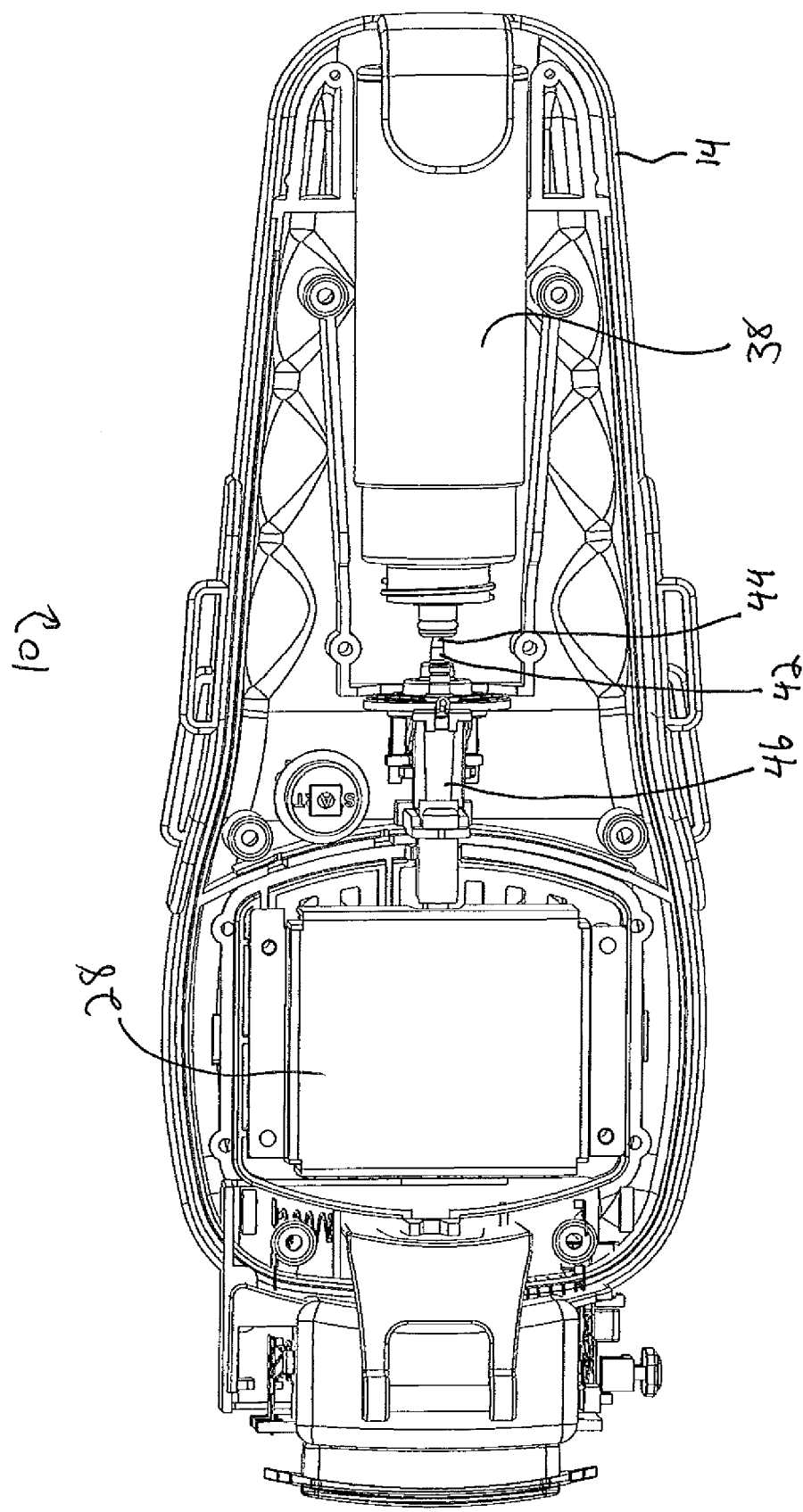
FIG. 4 is a top, broken away view of a flashlight/dispenser unit having a fuel cartridge secured therein according to an embodiment of the invention.

FIG. 4 shows a top view of the inside of the unit having a fuel cartridge positioned therein. Tank connection assembly 40 is not shown in order to allow the fuel metering system to be viewed. In one preferred embodiment, and as shown in FIG. 4, the fuel metering system comprises a plunger 42 having one pointed end 44 that is utilized to depress a fuel cartridge valve and a second end that is connected to a spring which exerts a biasing force thereupon. When cartridge 38 is inserted and secured in assembly 40, plunger 42 is pushed downward (toward the cartridge) by the attached biasing spring (not shown) thereby opening the cartridge valve and permitting gas to flow therefrom. Thereafter, pressure exerted from escaping gas builds up to apply a counter force to plunger 42. Eventually the pressure from escaping gas overcomes the pressure exerted by the spring, and the pressure build-up pushes the plunger off of the cartridge valve, thereby terminating supply. Once the gas pressure diminishes and there is no counter pressure on the spring—the plunger is forced into the valve once again to permit gas flow. This allows for an effective gas regulating system. Fuel cartridge 38 is preferably filled with a gaseous or liquid hydrocarbon fuel such as butane or propane.

In an embodiment of the invention, instead of a removable cartridge, a refillable reservoir for storing hydrocarbon fuel is disposed inside of the housing 12 of the flashlight. The reservoir may be permanently or removeably fixed inside therein.

Figure 5:
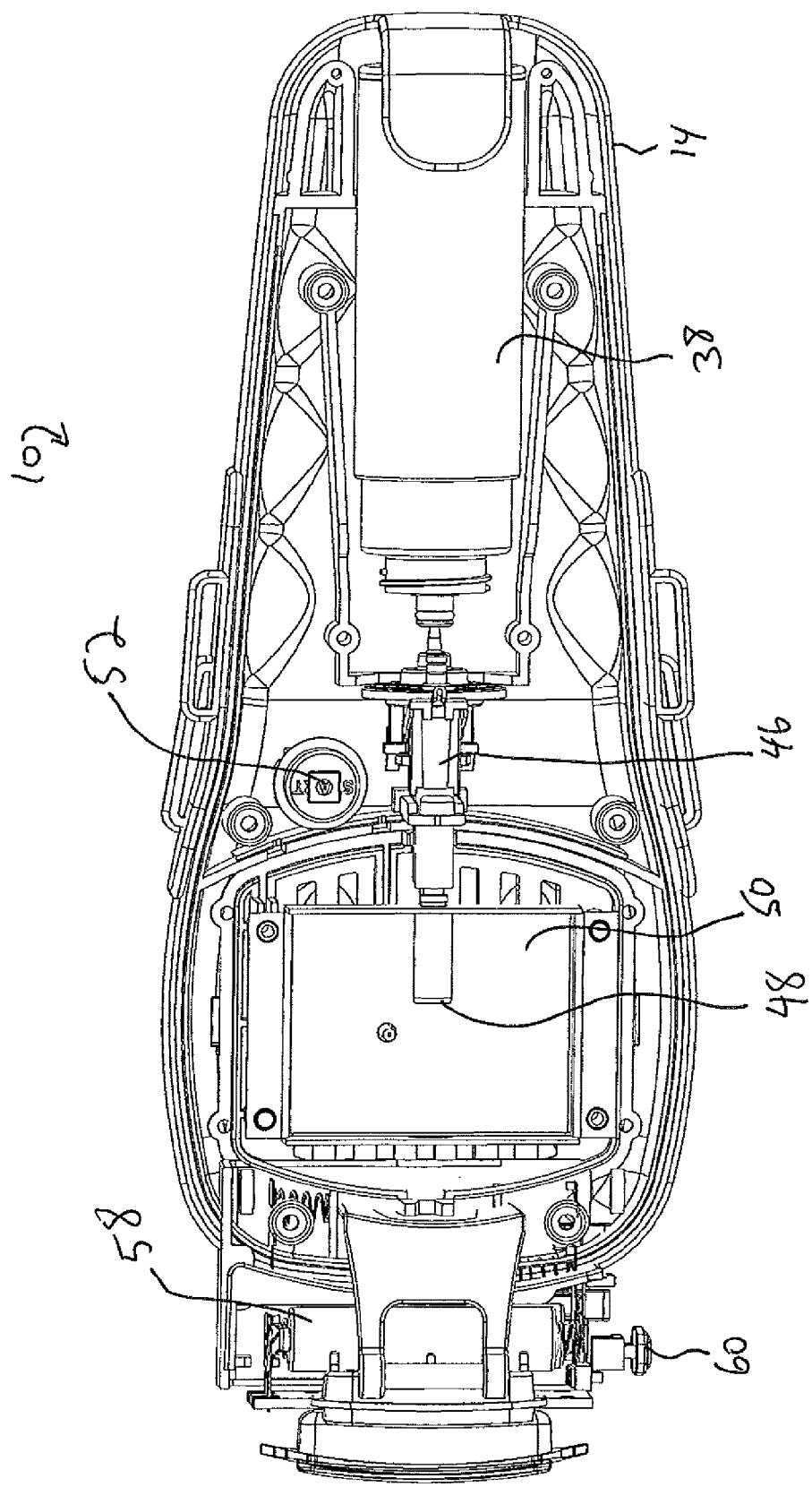
FIG. 5 is a top, broken away view of a flashlight/dispenser unit of FIG. 4, shown without the heating plate according to an embodiment of the invention.

Fuel flowing from the fuel cartridge is delivered to a venturi tube 46, which has an opening for the intake of air thus creating a fuel/air mixture. The fuel/air mixture is carried by the venture tube and is accelerated into a combustion nozzle 48 (shown in FIG. 5) located in a combustion chamber 50.

Combustion chamber 50 comprises an ignition system for initiating hydrocarbon combustion. In a preferred embodiment, a pair of electrode wires is provided, which emanate from a piezoelectric device that is in contact with "start" button 52. One wire has a first end, which emanates from piezoelectric device and terminates in contact with heating plate 28. Another wire emanating from the piezoelectric device terminates in close proximity to combustion nozzle 48. As such, when button is activated, a spark jumps from the terminal end of the wire to combustion nozzle 48, thereby completing an ignition circuit. It will be understood by those of ordinary skill in the art that combustion may be initiated using any of various energy sources. For example an electric heating element, a heated wire or a means or friction energy may be utilized to initiate combustion in embodiments of the invention.

As shown in FIG. 4, heating plate 28 is positioned directly above the heating chamber 50. As a result, heating plate 28 becomes sufficiently heated (when the combustion system is active) in order to volatize volatilizable substances. As described, in a preferred embodiment, volatilizable substances are preferably impregnated onto a mat—which is inserted onto the heating plate 28. It will be understood by those of ordinary skill in the art that the mat need not be placed directly on heating plate 28, rather it need only to be positioned within a close enough proximity to the flame to be sufficiently heated therefrom. Moreover, it will be understood by those of ordinary skill in the art that the mat 24 may be heated directly from a flame or other heat source without necessitating a heat plate for thermally receiving and releasing heat.

It will be understood by those of ordinary skill in the art that sufficient heat may obtained via a variety of heat sources—all of which are within the scope of the current invention. For example, as described in U.S. Pat. No. 5,928,605—the contents of which are incorporated by reference herein—a heat plate is heated by the flameless combustion of fuel on the surface of a catalytic structure. Such a catalytic system may be used in an embodiment of the current invention.

Figure 6:
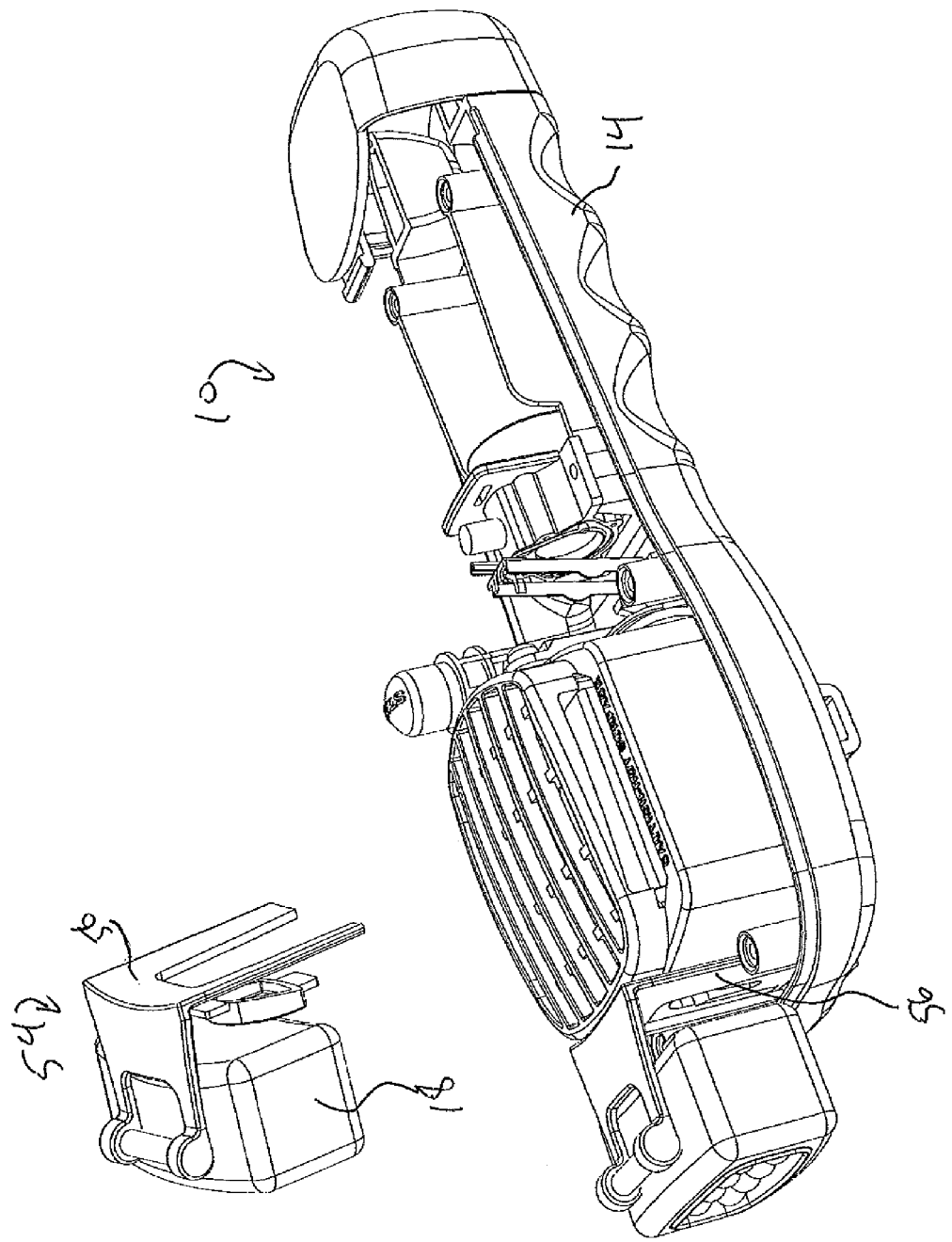
FIG. 6 is a top, perspective broken away of a flashlight/dispenser unit and a light box according to an embodiment of the invention.

As described, in addition to the above-mentioned dispensing system, the unit also includes a light source for transmitting a direct light beam—much like a conventional flashlight. In one embodiment, and as shown in FIG. 6, a detachable light box 54 is provided, which preferably contains one or more LEDs or light bulbs and one or more batteries. In a preferred embodiment, light box 54 comprises an external connector 56. External connector 56 is sized and shaped to insert into a corresponding slot in housing 12 of the device. As such, the light box 54 could be removed when no light is required and it could be added as desired.

In a preferred embodiment LEDs are used as a light source, however, it will be understood by those of ordinary skill in the art that an incandescent or fluorescent bulb may be utilized.

Most preferably, light box 54 contains its own power source. To that end, any of a variety of battery types known to one of skill in the art may be utilized. For example, removable disposable batteries, removable re-chargeable batteries or fixed rechargeable batteries all are possible sources of electrical current to supply a light source in accordance with embodiments of the invention. For example, in FIG. 5, a light box is shown without its housing 18. As shown, a battery 58 such as, for example, a standard 1.5V battery is placed in a battery box. An external activation button 60 is placed in close proximity to the battery 58, such that when pressed it makes contact therewith and completes an electrical circuit—causing the light bulb(s) to become eliminated. In another example, and as shown in FIG. 3 one or more lithium button cell batteries 62 are utilized. Alternatively, the unit is provided with solar panels for absorbing solar radiation. Such stored energy is converted into electrical energy, which is used to recharge a rechargeable battery for powering the light source.

In one embodiment, button 60 is wired such that there are more than two possible configurations. In one configuration, (e.g. for a "High" setting) all of the LEDs are activated whereas in another configuration (e.g. for a "Low" setting) fewer than all of the LEDs are activated.

In another embodiment, all of the LEDs or bulbs are activated when the switch is turned on, except that the intensity of the light is controlled by a dimmer or the like which is well know in the art for varying the current flow to a light bulb.

Figure 7:
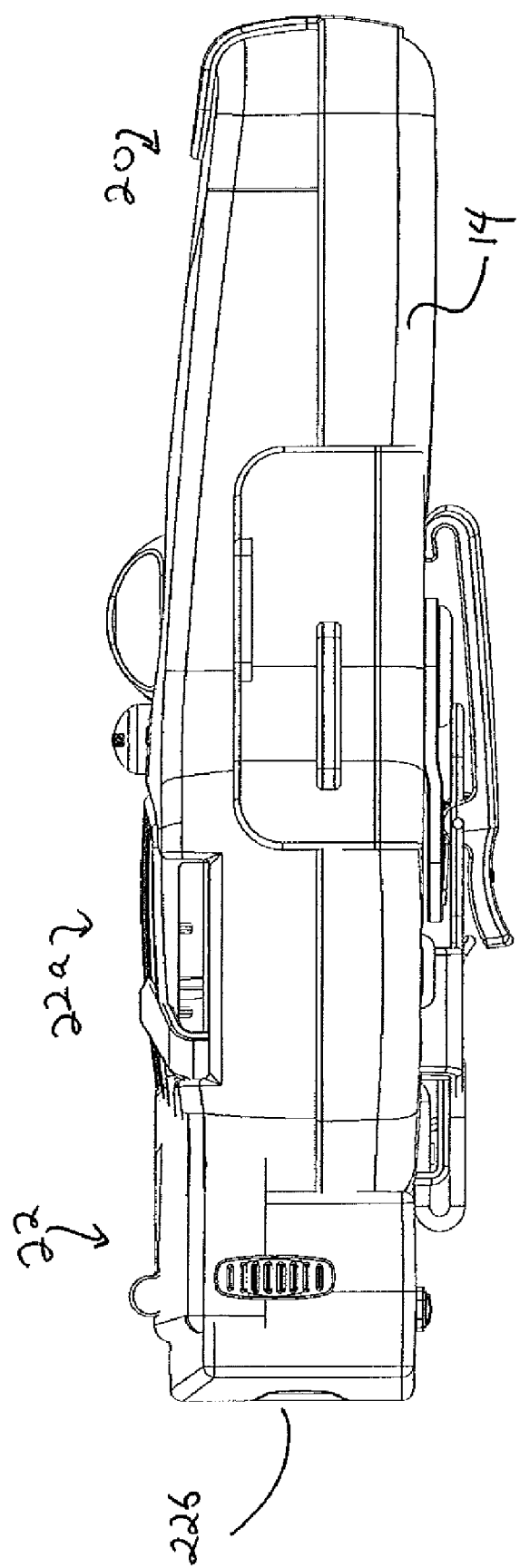
FIG. 7 is a side, elevational view of a flashlight/dispenser unit having an integral light box according to an embodiment of the invention.

It will be understood by those of ordinary skill in the art that LEDs or light bulbs may be provided in a compartment integral to the unit. As shown, for example, in FIG. 7 a light emitting area 22b is contiguous with and integral to the unit 10.

Having described this invention with regard to specific embodiments, it is to be understood that the description is not meant as a limitation since further modifications and variations may be apparent or may suggest themselves to those skilled in the art. It is intended that the present application cover all such modifications and variation as fall within the scope of the appended claims.

What is claimed is:

1. A portable apparatus for dispensing a volatilizable substance and for supplying light comprising:
    a dispensing unit comprising a housing;
    an assembly disposed in said housing for receiving a fuel cartridge;
    a tube for delivering fuel from said fuel cartridge to a combustion nozzle;
    an energy source for igniting a fuel/air mixture for a combustion at said combustion nozzle, said combustion comprising a heat source for volatilizing a volatilizable substance;
    a heating plate disposed above said heat source;
    said dispending unit further comprising at least a light source, said light source being powered by electricity;
    whereby said light source and said heat source are controllable independently of each other.

2. The apparatus of claim 1, wherein said light source comprises at least an LED.

3. The apparatus of claim 1, wherein said light source comprises at least an incandescent light bulb.

4. The apparatus of claim 1, wherein said light source comprises at least a fluorescent light bulb.

5. The apparatus of claim 1, wherein said electricity to power said light source is generated by a battery.

6. The apparatus of claim 1, wherein said electricity to power said light source is generated by a rechargeable battery.

7. The apparatus of claim 6 wherein said rechargeable battery is recharged by solar energy.

8. The apparatus of claim 1, further comprising a dimmer, said dimmer controlling the current flow to said light source.

9. The apparatus of claim 1, wherein the electric light is controlled by a switch.

10. The apparatus of claim 1, wherein said fuel cartridge is selectively removable from said dispensing unit.

11. The apparatus of claim 1, wherein said fuel cartridge contains butane.

12. The apparatus of claim 1, wherein said fuel cartridge contains propane.

13. The apparatus of claim 1, wherein hydrocarbon fuel is supplied from a re-fillable reservoir that is permanently or removeably affixed to said apparatus.

14. The apparatus of claim 1, wherein said combustion nozzle supports a flame.

15. The apparatus of claim 1, wherein said heat source comprises combustion of fuel on the surface of a catalytic structure.

16. A portable apparatus for dispensing a volatilizable substance and for supplying light comprising:
    a dispensing unit comprising a housing;
    a heat source disposed in said housing, said heat source providing heat for volatilizing said volatilizable substance;
    said dispending unit further comprising at least a light source, said light source being powered by electricity;
    whereby said light source and said heat source are controllable independently of each other.

17. The apparatus of claim 16, whereby said heat source comprises combustion of a hydrocarbon fuel.

18. The apparatus of claim 16, whereby said light source comprises at least one of an LED, an incandescent light bulb and a fluorescent light bulb.

19. The apparatus of claim 16 further comprising an area for receiving a mat being impregnated with a volitilizable substance, said area being in thermal contact with said heat source.

* * * * *